THREADED DRILL ROD ELEMENT

Original Filed May 18, 1965 3 Sheets-Sheet 1

United States Patent Office

Re. 27,284
Reissued Feb. 15, 1972

27,284

THREADED DRILL ROD ELEMENT

John Anders Hjalsten and Gunnar Arne Gustafsson, Sandviken, Sweden, assignors to Sandvikens Jernverks Aktiebolag, Sandviken, Sweden Original No. 3,388,935, dated June 18, 1968, Ser. No. 633,339, Mar. 27, 1967, which is a continuation of Ser. No. 456,656, May 18, 1965. Application for reissue Apr. 13, 1970, Ser. No. 28,157
Claims priority, application Sweden, May 29, 1964, 6,532/64
Int. Cl. F16b *31/06*
U.S. Cl. 287—117 9 Claims

Matter enclosed in heavy brackets [ ] appears in the original patent but forms no part of this reissue specification; matter printed in italics indicates the additions made by reissue.

ABSTRACT OF THE DISCLOSURE

A drill rod coupling comprising a threaded rod and a matching threaded sleeve, the rod threads having at least two starts and flank angles adjacent the crests of at least 45° which gradually increase toward the base, which latter has a concave shape with a radius greater than the depth of the thread, the flanks of the thread being symmetrical and the crests being bevelled, and spaced from the bottoms of the sleeve threads.

This application is a continuation of our application Ser. No. 456,656, filed May 18, 1965, now abandoned.

The present invention relates to drill rods composed of at least two elements which are coupled together by means of threads on the elements, as for instance extension rods having externally threaded ends coupled to internally threaded coupling sleeves.

Modern drilling technique continues to develop towards the use of more and more powerful drilling machines and higher drilling effects. When using drill rods consisting of threaded elements many methods of drilling cause a tightening of the thread connections because of the rotation of the drill during drilling. This tightening is especially pronounced in, for instance, percussion drilling in which separate driving means are used for rotating the drill and also in the operation of rotary earth drills. As the torque which is required for separating the rod elements is related to the torque by which the threads have been screwed together it is difficult to separate the drill rod elements after drilling with a high torque.

The invention presents a solution to this problem, which gradually has grown with the technical development, and consists in a special shape of the threads which lessens the torque necessary for separating the threads while at the same time the drill rod elements are sufficiently held together and are held aligned with each other during the drilling.

Figure 1:
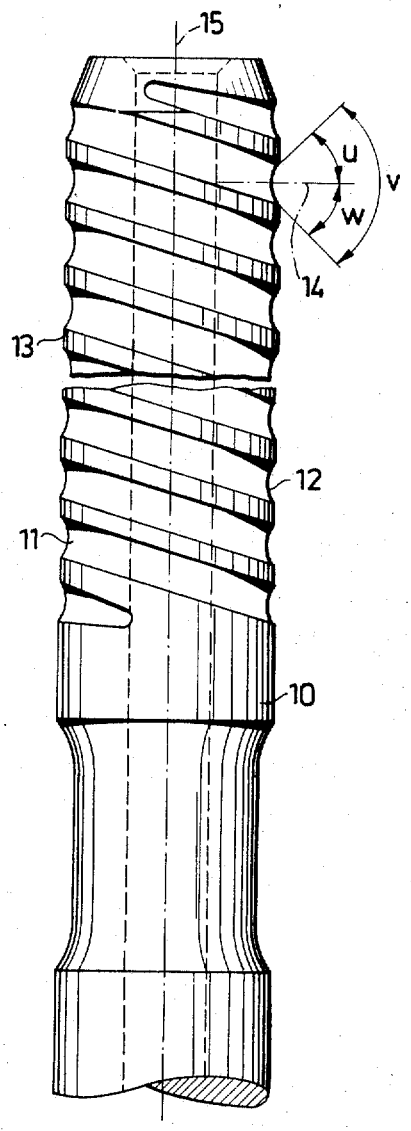
Figure 2:
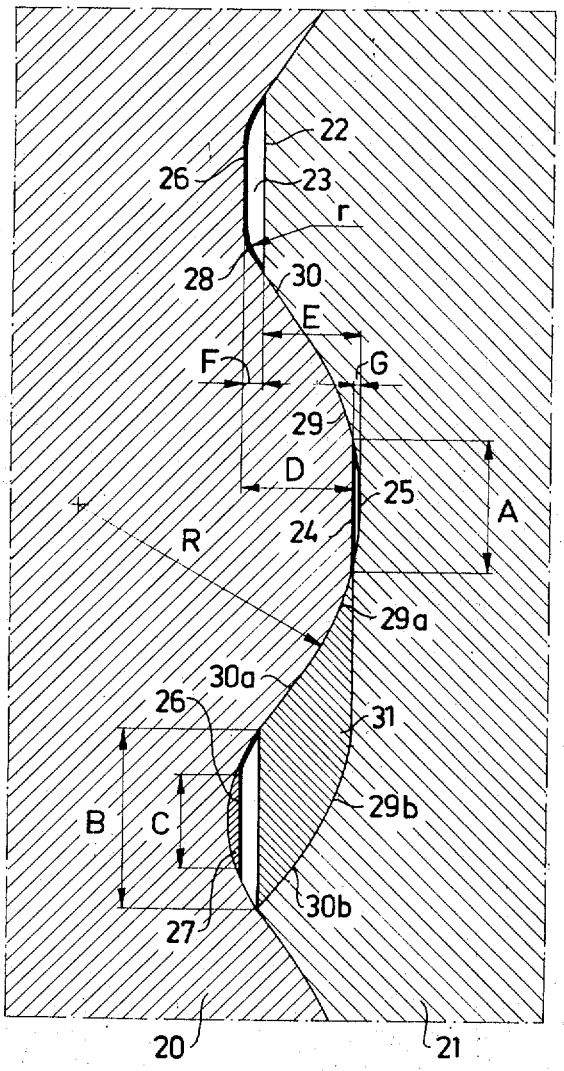

Details of the invention appear from the following description and the acompanying drawing which illustrate:

FIG. 1 is a drill rod thread according to the invention;

FIG. 2 an enlarged longitudinal section of two coupled threaded elements and

Figure 3:
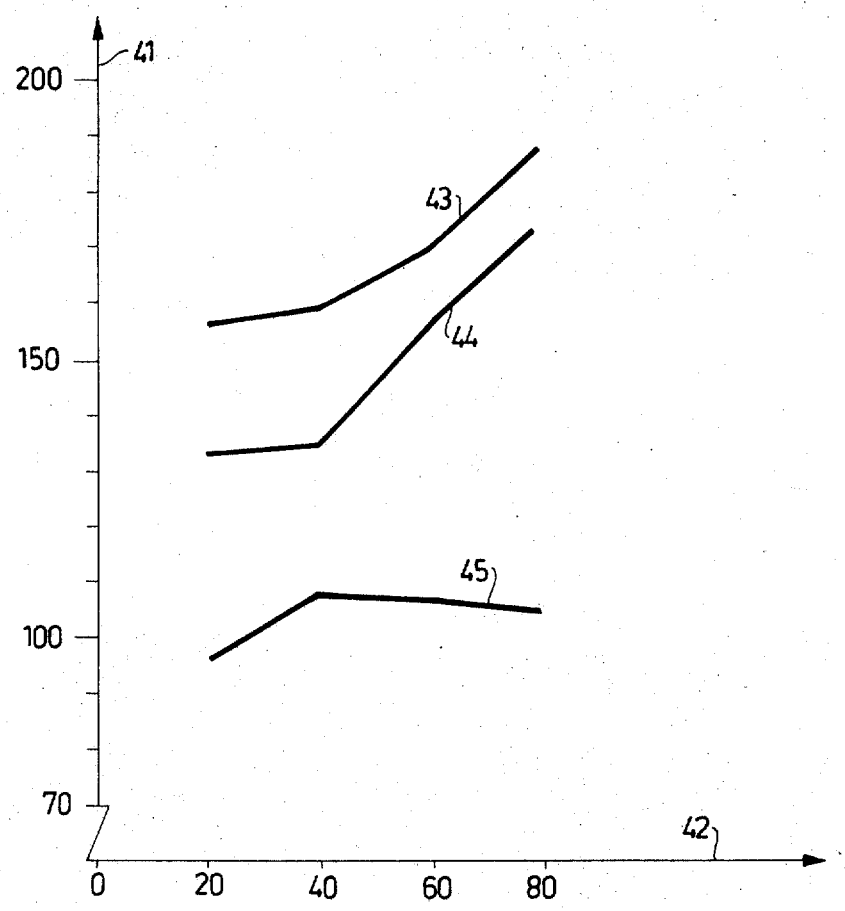

FIG. 3 a torque diagram for different types of threads.

FIG. 1 shows one end of an extension rod 10, which has an external thread 11 for connection to a sleeve shaped rod element, as a separate coupling sleeve or a sleeve integral with the adjoining extension rod. A part 12 of the thread forming the flanks of the thread is concavely rounded while the crest 13 is straight in longitudinal section. The flank portion 12 has a longitudinal section as illustrated in FIGS. 1 and 2 which is symmetrical in relation to a line 14 perpendicular to the drill axis 15 and situated at equal distances from the nearest crests. The flanks are thus also symmetrical with regard to a normal to the axis 15 through the crest of the thread and run from the crest towards the bottom at equal angles with the axis.

The torque necessary for separation of the threads in relation to the torque by which the threads have been connected depends essentially on two factors, the pitch of the thread and the flank angle. The necessary separating torque becomes greater the greater is the flank angle and smaller the greater is the pitch. The flank angle is illustrated in FIG. 1, the angle "v" being the flank angle and the angles "u" and "w" being the inclination of the flanks in relation to the normal 14. In the present case the angles "u" and "w" are substantially equal.

In known threads with wholly rounded longitudinal sections the inclination of the thread surface varies, the surface being parallel with the axis or tangent to planes parallel to the axis at the crests and bottoms and at a maximum inclination therebetween. At the portions where the flanks are inclined at a small angle to the axis a wedging effect arises, so that the force holding the threads together is great and a great torque is required for the separation of the threads. According to the invention the crests of the threads are beveled and have a straight longitudinal section whereby the contact between the matching thread surfaces adjacent the crests of the rod thread is established only at portions of the thread having an angle of inclination to the axis which is substantially different from 0°. In this way a limited joining force between the threads is obtained. In order to still more reduce the joining force the thread according to the invention is made with two or possibly more starts thus providing a greater thread pitch. It is of course necessary to observe that the pitch is not so great that the thread unwinds itself, for instance when a vertical drill rod is extracted from a drill hole.

In FIG. 2 is shown a portion 20 of a coupling sleeve with an internal thread and a portion 21 of an extension rod with an external thread. The rod thread has a straight longitudinal section at the crest 22 and there is a space 23 between the crest 22 of this thread and the bottom 26 of the matching thread of the sleeve. The sleeve thread in the same way has a straight longitudinal section at its top 24 thus leaving a space 25. As indicated the crests 22 and 24 preferably have straight longitudinal sections but may be somewhat curved so long as spaces 23 and 25 are maintained. The threads are in contact with each other along the major parts of the inclined flank portions.

In the illustrated embodiment the bottom of the sleeve thread has a straight longitudinal section 26 which gives the advantage that the thinnest and weakest part of the sleeve is thicker than if the bottom of the thread were rounded. It is also easier to manufacture the sleeve by pressing if the thread has this shape. The shaded area 27 marks the gain of thickness. In the embodiment illustrated the bottom portion 26 is connected to the flanks of the thread by curved portions 28. The main part of the flank of the sleeve thread comprises a convexly curved portion 29. The curved portions 28 and 29 are connected by a shorter straight portion 30. However, the portion 30 may be absent, the point of connection between portions 28 and 29 forming an inflection point in the longitudinal contour.

The radius "r" of the rounded portions 28 is suitably relatively small, so that the increase 27 of the thickness is as great as possible. The radius "r" of portions 28 is usually smaller than the radius "R" of the curved part 29a of the thread flanks. Because of this the rounded portions 28 are not suitable for contact with the attached thread, and therefore the space 23 is made sufficiently great to avoid this contact. In the illustrated case the space 23 is therefore greater in radial direction than the space 25. The radii "R" and "r" can suitably be constant, which means that the section of the flank is a circular arc, but also other types of curvature can be used. In the illustrated embodiment the bottom of the rod thread is rounded, but there can be straight portions like the portion 26 of the sleeve thread.

The radius "R" should be relatively great and at least as great as or greater, preferably substantially greater than the depth E of the rod thread. The reason for this is that the rod thread must have a smooth curvature, the flanks meeting at the bottom without sharp corners, in order that the fatigue strength of the rod thread shall be as high as possible. The concave portion 29 may extend to the crest 22, or there may be as above stated a short straight portion 30, which in the rod thread lies adjacent the crest. The angle between the crest 22 and the flank should be relatively pronounced or sharp in order to avoid as much as possible portions which form a small angle to the axial direction, causing wedging and binding. It is true that such portions are present at the bottoms of the rod threads, but this is necessary in order to increase the fatigue strength of the rod thread.

A suitable value of the angle "u" is 45–70°, preferably 50–60°. The angles "u" and "w" should be at least approximately equal, the longitudinal section of the thread being symmetrical with regard to the line 14 in FIG. 1 and consequently also with regard to the crests of the thread. The angles "u" and "w" are then assumed to be measured at the point of the flank where they have their minimum value, i.e. where in the inclination of the flank with regard to the axis 15 is greatest. This occurs in the rod thread adjacent the crest and in the sleeve thread at the straight portion 30 between the curved portions 28 and 29, or, if there is no straight portion 30, the inflection point between the curved portions 29a and 30a.

The advantage of the said symmetry of the angles is that the quantity of metal in axial direction in the threads is suitably distributed with regard to the axial wear. The surfaces 29a and 30a on the rod thread in FIG. 2 will be worn down and move to the positions 29b, 30b, before the total surface of the flank begins to diminish. The flank can thus be moved along the shaded portion 31 without diminishing the contact surface, the portion 31 representing the worn away material. The sleeve thread will be worn in the same way, and the quantity of material in both threads should be adjusted in such a way that an optimal life is obtained for the joint. The symmetrical form of the thread gives approximately equal depth of wear in axial direction for the sleeve thread and the rod thread. In the embodiment shown in FIG. 2 the material in the rod thread is somewhat more wear resistant, which often is advantageous, because the life of the sleeve is limited by other factors and is shorter than the life of the rod, and furthermore the rod is more expensive to manufacture than the sleeve.

By the symmetry of the thread in combination with the rather small inclination of the flank in relation to the axis, i.e. the relatively large angle "u," and also by the close fitting between the threads, which fill out each other well, a good guidance of the parts in relation to each other is obtained so that angular deflections of the rod are avoided.

The length B of the rod thread crests measured in the axial direction should be at the most 0.4, preferably at the most 0.3, and at least 0.05, preferably at least 0.1 of the distance between the centers of two adjacent crests which, as the thread is a multi-start thread, belong to different windings of the thread. The length A of the possibly flattened tops of the sleeve threads may as illustrated, be somewhat smaller than the length B.

The pitch of the thread is greater than usual, because there are at least two starts. For threads of a large diameter the number of starts can be three or more. The pitch should be at least about 0.35 of the pitch diameter of the thread. Usually it should not exceed about 0.75 of the pitch diameter in order to avoid that the thread unwinds itself.

The angle between the helix of the thread and a plane, perpendicular to the axis—i.e. the lead angle—should be in the main similar for different diameters but for practical reasons the pitch is similar for diameters between a limited range, the lead angle thus somewhat varying. As an example of this can be mentioned the following values employed in practice:

| Diameter, inches | Number of entrances | Pitch, inches | Lead angle, degrees |
|---|---|---|---|
| 1½ | 2 | 8/9 | 11 |
| 2¼ | 2 | 8/9 | 7.5 |
| 3½ | 3 | 1⅓ | 7.1 |

The lead angle should preferably not be outside the range 5–14°, the preferred range being 7–11°.

Practical tests have proved that threads according to the invention are relatively easy to disconnect and that the torque for disconnection is in the main constant even if the connecting torque increases. In FIG. 3 a comparison is made between different types of threads. The disconnecting torque is marked along the vertical axis 41 and the connecting torque along the horizontal axis 42. The torques are expressed in kilogrammeters. The curve 43 represents a usual rounded thread. The curve 44 represents a rounded thread with a crest that is straight in longitudinal section and has an unsymmetrical longitudinal section. The curve 45 represents a thread according to the invention. Curves 43 and 44 show that in earlier known threads the disconnection torque increases approximately in the same proportion as the connection torque. For the thread according to the invention the disconnection torque rapidly reaches a maximum value and remains constant at this value independently of the increase of the connection torque. Said value is substantially smaller than for the earlier known types of threads but it is not so small that the threaded joint can unwind by itself. This special form of thread provides thus a value of the disconnection torque which is not too great and not too small and remains substantially constant. This result is obtained by a suitable combination of the different factors involved including the smooth section line, the pitch and the relatively small flank angle.

As an example of a thread connection according to the invention can be mentioned a rod thread on a rod with about 1½" outer diameter and a connected sleeve thread in a coupling sleeve. The pitch is 8/9" (22.6 mm.) and there are two entrances. The rod thread has a rounded longitudinal section along the flanks and the bottom, the radius R=5 mm. and the crests 22 having the width B=3.3 mm. The height E of the thread is 1.7 mm. The space F between the crest and the bottom of the sleeve thread is 0.35 mm. The sleeve thread has bottom surfaces 26 with a width C=1 mm. and top surface or crest 24 with the width A=2 mm. The space 25 between the crest 24 and the bottom 25 of the connected thread is G=0.1 mm. The height of the thread D=1.95 mm. The length of the coupling sleeve is about 190 mm.

We claim:

1. Drill rod coupling for percussion drilling comprising a threaded rod and a matching threaded sleeve and being of the type suitable for connecting rods for percussion drilling, said threads having a relatively high pitch and a generally wave-shaped profile. The threads being adapted to respond to a low disconnection torque and to provide a high fatigue strength and having the following features in combination:

(a) the threads have at least two starts, (b) the flank angle of the rod thread between the flank and a normal to the drill rod axis has a minimum in the vicinity of the crest of the rod thread, where it is [45°–70°] *50–60°*

(c) the flank angle of the rod thread increases gradually from said minimum towards the bottom of the thread, a substantial portion of the flank comprising the base portion thus having a concave shape and the radius of which is at least as great as the depth of the thread, (d) the flanks of the threads are symmetrical and inclined equally with regard to said normal, (e) the crests of the rod threads are beveled and have a profile substantially parallel to the drill rod axis, and (f) the crests of the rod threads are spaced from the bottom of the matching sleeve threads.

2. Drill rod coupling as defined in claim 1 in which the beveled tops of the rod threads are joined to the adjacent flanks by a relatively pronounced angle.

3. Drill rod coupling as defined in claim 1 in which the tops of the sleeve threads are beveled and have a substantially rectilinear profile parallel to the drill axis.

4. Drill rod coupling as defined in claim 1 in which the bottoms of the sleeve threads are beveled and have a substantially rectilinear profile parallel to the drill axis.

5. Drill rod coupling as defined in claim 1 in which the beveled crests of the rod threads have an extension measured in the axial direction which is 0.05–0.4 of the distance between the centers of adjacent crests.

6. Drill rod coupling as defined in claim 1 in which the rod thread comprises minor flank portions adjacent the crest, said minor flank portions having a straight longitudinal section and being inclined at the said minimum flank angle.

7. Drill rod coupling as defined in claim 1 in which the beveled crest portions are substantially rectilinear.

8. Drill rod coupling as defined in claim 1 in which the sleeve is integral with one of the coupled rods.

9. Drill rod coupling as defined in claim 1 in which the radius of the concave portion of the rod thread flank is substantially greater than the depth of the thread.

References Cited

The following references, cited by the Examiner, are of record in the patented file of this patent or the original patent.

UNITED STATES PATENTS

| | | | |
|---|---|---|---|
| 2,052,011 | 8/1936 | Baker | 287—125 |
| 2,052,019 | 8/1936 | Baker | 287—125 |
| 2,062,407 | 12/1936 | Eaton | 285—334 |
| 2,592,698 | 4/1952 | Hubbard | 287—125 X |
| 2,681,815 | 6/1954 | McCarn | 285—333 |
| 3,388,935 | 6/1968 | Hjalsten et al. | 287—117 |

FOREIGN PATENTS

| | | | |
|---|---|---|---|
| 745,931 | 11/1966 | Canada | 285—390 |
| 801,456 | 9/1958 | Great Britain. | |
| 757,828 | 5/1967 | Canada. | |

DAVID J. WILLIAMOWSKI, Primary Examiner

W. L. SHEDD, Assistant Examiner

U.S. Cl. X.R.

285—334